United States Patent [19]

Kosaka

[11] Patent Number: 5,012,356

[45] Date of Patent: Apr. 30, 1991

[54] SWITCHING CIRCUIT

[75] Inventor: Yositeru Kosaka, Zushi, Japan

[73] Assignee: Victor Company of Japan, Limited, Kanagawa, Japan

[21] Appl. No.: 483,470

[22] Filed: Feb. 22, 1990

[30] Foreign Application Priority Data

Feb. 28, 1989 [JP] Japan .................................. 1-47882

[51] Int. Cl.$^5$ ...................... G11B 15/12; G11B 27/02; H04N 9/79
[52] U.S. Cl. .................................... 360/61; 360/14.3; 358/311
[58] Field of Search .................... 360/61, 62, 64, 14.2, 360/14.3; 330/51; 307/255, 475; 358/311, 335

[56] References Cited

U.S. PATENT DOCUMENTS 3,173,134 3/1965 Petermann .......................... 360/62
3,959,817 5/1976 Honjo et al. ....................... 360/62

Primary Examiner—Aristotelis M. Psitos
Assistant Examiner—Varsha V. Sheladia
Attorney, Agent, or Firm—Koppel & Jacobs

[57] ABSTRACT

A switching circuit built in a record/playback mode switching circuit of a video tape recorder. Compulsory local overwriting can be executed while the playback of a recorded magnetic tape is under way. This allows characters, graphic information, VITC signal or similar multiplex signal carrying desired information to be recorded in the same manner as postrecording in a recorded magnetic tape which is being played back.

5 Claims, 2 Drawing Sheets

SWITCHING CIRCUIT

BACKGROUND OF THE INVENTION

The present invention relates to a switching circuit advantageously applicable to a record/playback mode switching circuit of a video tape recorder.

With a modern broad-band video tape recorder (simply referred to as a VTR hereinafter), it is possible to record and reproduce a multiplex signal directly on and from a magnetic tape. This allows characters information, graphic information, VITC (Vertical Internal Time Code) signal or similar multiplex signal carrying desired information to be overwritten in a magnetic tape in which a video signal has been recorded. A multiplex signal and a video signal will be successfully combined if a combining system consisting of a personal computer, word processor software and some hardware, and system software for controlling the combining system is developed and used. Specifically, a multiplex signal may be combined with a video signal by preparing two VTRs and the combining system stated above, loading one VTR with an original tape in which a video signal has been recorded, playing back the original tape, feeding the resultant video signal to the combining system, adding the multiplex signal to the video signal in the combining system, and recording the resultant combined signal in another tape by the other VTR. Such an approach is undesirable, however, because the video signal is dubbed in another tape resulting in the picture quality being critically degraded.

In the light of the above, there has been proposed a method which overwrites a character multiplex signal or a VITC signal, for example, in a recorded magnetic tape locally and forcibly at an adequate position within a vertical blanking according to standards. Although such a scheme prevents a video signal from being dubbed in and, therefore, eliminates the degradation of picture quality, it is not practicable unless at least the record/playback mode is switched over at high speed. More specifically, the playback and record mode have to be set up alternately within a switching time of less than 100 nanoseconds only during the period of several lines in a vertical blanking in which the multiplex signal should exist. The record/playback mode switchover is usually implemented by a switching circuit which connects one of a record and a playback amplifier to ground and the other to a video head. While various kinds of switching circuit have been proposed for the above application such as a circuit using a relay and a circuit using transistors, they are not capable achieving a satisfactorily high switching speed.

SUMMARY OF THE INVENTION

It is therefore an object of the present invention to provide a switching circuit built in a record/playback mode switching circuit of a VTR capable of overwriting a desired multiplex signal in a magnet tape in which a video signals has been recorded.

It is another object of the present invention to provide a generally improved switching circuit.

A switching circuit for interrupting a signal path to a recording head in accordance with the present invention comprises a complementary emitter-follower circuit comprising a first and a second transistor, a power source terminal to which a DC bias voltage for linearly driving the first and second transistors is applied, a signal inputting circuit connected to the power source terminal and comprising a first and a second input connecting point to which the DC bias voltage is applied, and a switching circuit comprising a first and a second switches each having a single movable contact which is operated by a switching pulse signal and two stationary contacts. The movable contact of the first switch and the movable contact of the second switch are connected to the bases of the first and second transistors respectively. One of the stationary contacts of the first switch and one of the stationary contacts of the second switch are respectively connected to the first and second input connecting points of the signal inputting means. The other stationary contact of the first switch and the other stationary contact of the second switch are connected such that the first and second transistors are inversely biased upon interruption of the signal path.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
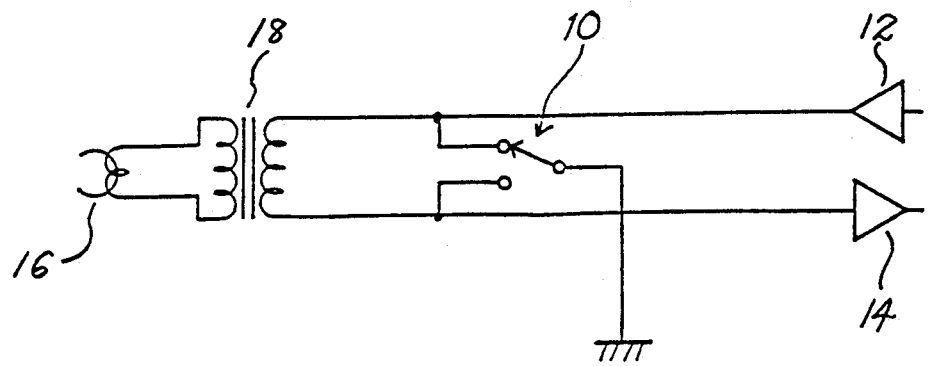
FIG. 1 is a circuit diagram showing a prior art switching circuit.

To better understand the present invention, a brief reference will be made to a prior art switching circuit, shown in FIG. 1. As shown, the switching circuit has a switching element which is implemented by a relay 10. The relay 10 connects either one of a record amplifier 12 and a playback amplifier 14 to ground while connecting the other to a video head 16, i.e. a rotary transformer 18. A problem with this prior art implementation is that the switching speed available with the relay 10 is too low to select a playback mode and a record mode alternatively within a switching time of less than 100 nanoseconds only over the period of several lines in a vertical blanking in which a multiplex signal should exist.

Figure 2:
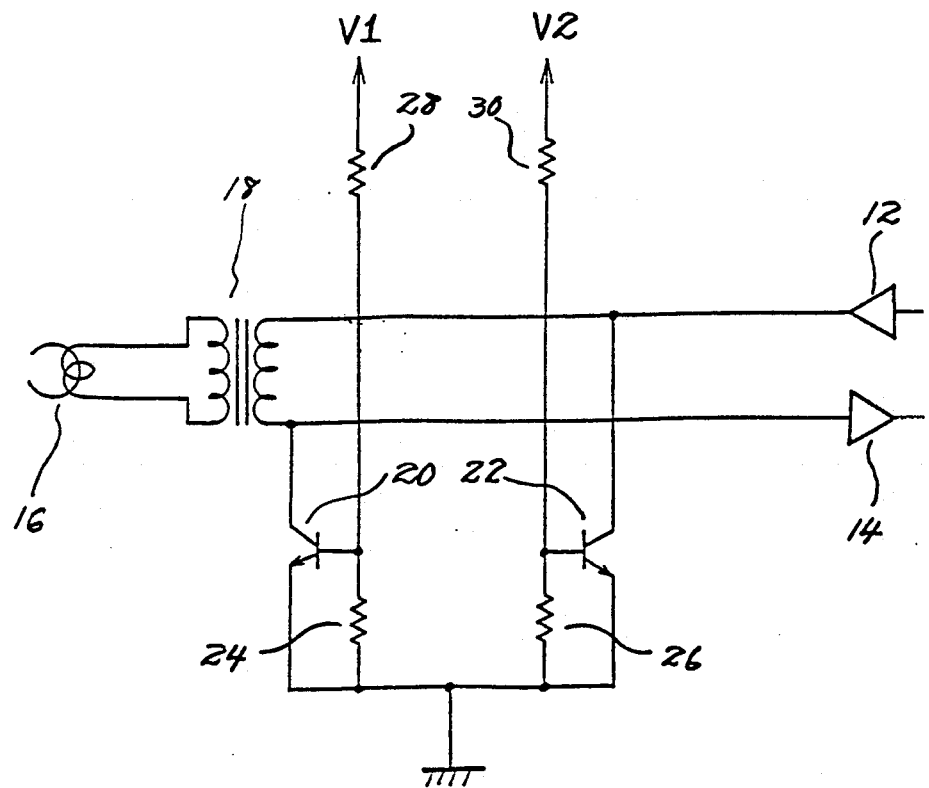
FIG. 2 is a circuit diagram showing another prior art switching circuit.

FIG. 2 depicts another prior art switching circuit commonly installed in a VTR of the type extensively used today. The switching circuit of FIG. 2 shares the same principle as the switching circuit of FIG. 1 and is different from the latter in that the relay 10 is replaced with transistors 20 and 22. Such a prior art switching circuit also has a problem of slow switching operations. Especially, a substantial turn-off time is needed in order to secure the storage time of the transistors 20 and 22. As shown in the figure, resistors 24 and 26 are connected between the emitter and the base of the transistor 20 and between the emitter and the base of the transistor 22, respectively. Resistors 28 and 30 are connected to the resistors 24 and 26, respectively. The switching circuit is, therefore, provided with an emitter-grounded amplifier configuration. In this kind of configuration, although the capacitance between the collector and the base of the individual transistors 20 and 22 itself is not more than several picofarads, it is as great as about 200 picofarads as viewed from the base side due to the mirror effect. It follows that the switching rate is low even in a turn-on condition because the capacitance between the collector and the base and the resistance of the associated resistor 28 or 30 serves the function of an integrating circuit. Power sources $V_1$ and $V_2$ are connected to the resistors 28 and 30, respectively. While a capacitor may be connected in parallel with each of the resistors 28 and 30 for speeding up the switching operations, it brings about switching back noise. Furthermore, since the collector-base capacitance is an NP junction capacitance, it is voltage-dependent and, in the non-bias condition, reaches the maximum value. This lowers the cut-off frequency of a low-pass filter which the collector-base capacitance constitutes in combination with the inductance of the video head 16, thereby critically limiting the playback frequency band avariable.

A preferred embodiment of the switching circuit in accordance with the present invention will be described with reference to FIG. 3. In the figure, the same components are designated by like reference numerals, and redundant description will be avoided for simplicity.

Figure 3:
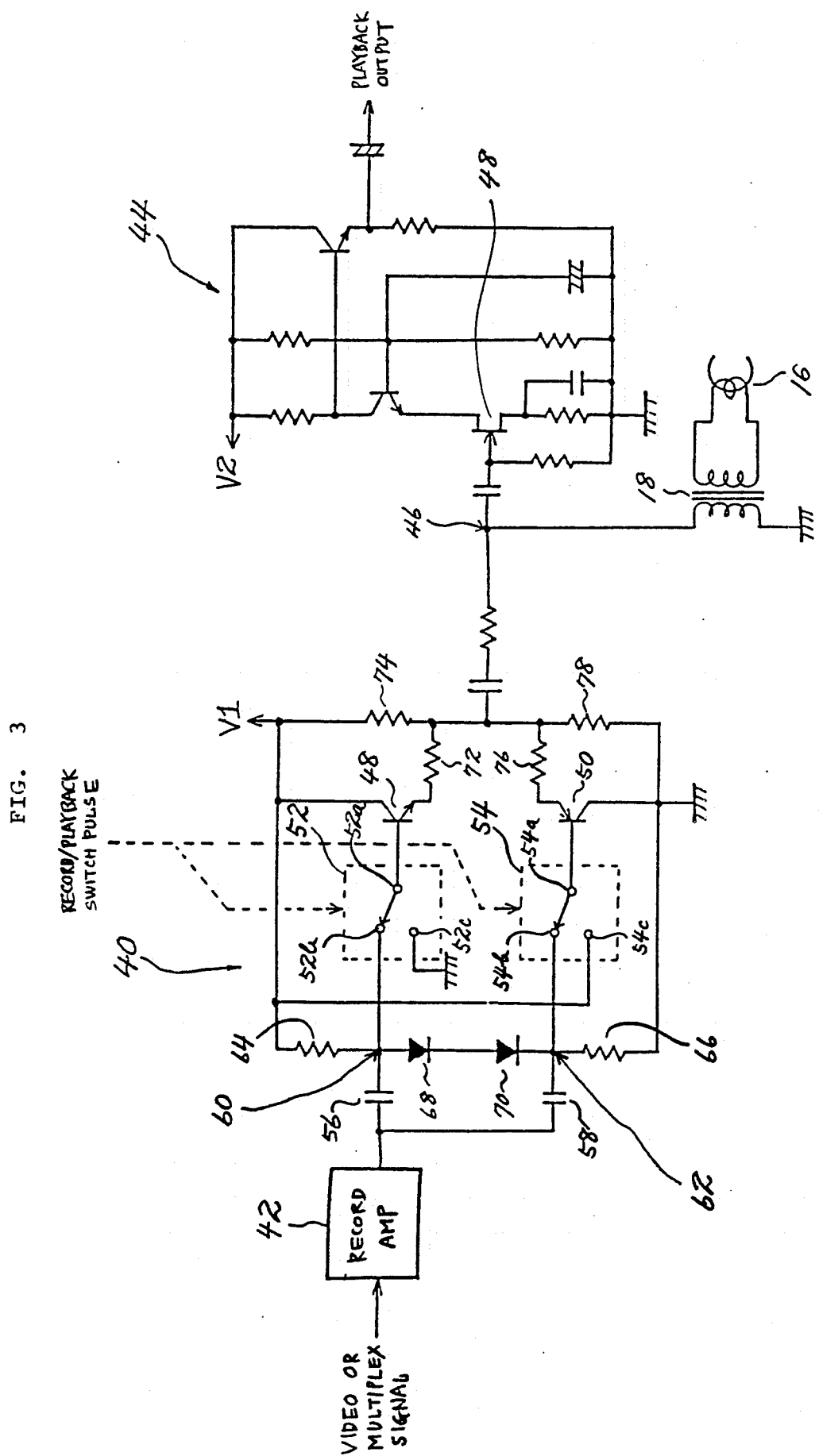
FIG. 3 is a circuit diagram showing a preferred embodiment of the switching circuit in accordance with the present invention.

Specifically, FIG. 3 shows a record/playback mode switching circuit for a VTR in which a switching circuit embodying the present invention is built in. As shown, the record/playback mode switching circuits is generally made up of a switching circuit 40, a record amplifier 42, and a playback amplifier 44. The switching circuit 40 receives from the record amplifier 42 a record signal which is a video signal in an ordinary record mode or character information, graphic information, VITC signal or similar multiplex signal in an overwrite mode. The record signal is amplified within the switching circuit 40 also and then outputted. The output of the switching circuit 40 is connected to a junction 46 of the input of a rotary transformer 18 of a video head 16 and the input of a playback amplifier 44. In response to R (record)/P (playback) switching pulses, the switching circuit 40 performs a recording operation in a record mode or a high-impedance operation in a playback mode in order to connect the video head 16 to the record amplifier 42 (record mode) or to the playback amplifier 44 (playback mode). A field effect transistor (FET) 48 is provided at the initial stage of the playback amplifier 44.

The construction of the switching circuit 40 will be described in more detail. As shown in FIG. 3, the switching circuit 40 has a complementary emitter-follower circuit which is made up of an NPN transistor 48 and a PNP transistor 50, and first and second 2-circuit 2-input analog switches 52 and 54. The first switch 52 has a common or movable contact 52a and stationary contacts 52b and 52c. The movable contact 52a is connected to the base of the transistor 48. The second switch 54 has a common or movable contact 54a and stationary contacts 54b and 54c, the movable contact 54a being connected to the base of the transistor 50. R/P switching pulses are applied to both of the switches 52 and 54 for switching them over. The record signal from the record amplifier 42 is routed through coupling capacitors 56 and 58 and signal input terminals 60 and 62 associated therewith to the stationary contacts 52b and 54b of the first and second switches 52 and 54, respectively. In order to cause the transistors 48 and 50 to operate linearly, a DC bias voltage is applied to each of the signal input terminals 60 and 62 by resistors 64 and 66 and diodes 68 and 70 which are connected between a power source V1 and ground. The other stationary contacts 52c and 54c of the switches 52 and 54 are connected such that the transistors 48 and 50 are inversely biased with respect to the PN junction between the base and the emitter. Specifically, the stationary contact 52c is connected to ground while the stationary contact 54c is connected to the power source V1. Resistors 72 and 74 and resistors 76 and 78 are connected between the emitter and the collector of the transistor 48 and between the emitter and the collector of the transistor 50, respectively.

In operation, when the switches 52 and 54 are held in the positions shown in FIG. 3, an instantaneous and compulsory overwrite record mode is set up. In this condition, the switching circuit 40 functions as an ordinary complementary emitter-follower circuit, i.e., a power amplifier for driving the video head 16. The recording system and the playback system are, therefore, operating at the same time. A problem particular to such simultaneous operations is eliminated by the FET 48 of the playback amplifier 44, as will be described. Specifically, should the transistor located at the initial stage of the playback amplifier 44 be implemented as a bipolar transistor, a diode (PN junction) comprise of the base and the emitter of the transistor would half-wave rectify the record signal and would thereby distort the record current noticeably. This is because the output of the switching circuit 40 which in the record mode serves as an amplifier is applied to the playback amplifier 44 also. The distortion of the record current not only distorts the playback waveform of the overwritten multiplex signal but also prevents the recording level from increasing, whereby an error occurs in a decoder adapted for the multiplex signal to prevent the multiplex signal from being reproduced. In the illustrative embodiment, the playback amplifier 44 has the FET 48 at its initial stage so that the input impedance is an extremely high linear impedance. This is successful in eliminating the above-discussed problem. Moreover, since the record signal is stably demodulated and outputted via the playback amplifier 44, the recording system is adjustable by observing the playback output.

On the other hand, when the movable contacts 52a and 54a of the switches 52 and 54 are respectively caused into connection with the stationary contacts 52c and 54c by the R/P switching pulses, both the transistors 48 and 50 are inversely biased between their bases and emitters by the resistors 74 and 78, respectively. As a result, the output points of the transistors 48 and 50 are opened to set up high impedance with each of the resistors 74 and 78 having a resistance value of several hundred kiloohms. In this condition, the playback output of the video head 16 is fed to the playback amplifier 44 only, setting up a stable ordinary playback mode. Since the coupling capacitance of the transistors 48 and 50 is smaller than in the prior art circuit of FIG. 2 due to the inverse bias of the PN junction, the circuitry shown in FIG. 3 achieves a broader playback frequency band.

As stated above, the illustrative embodiment has a hybrid structure which is, in a sense, a "combined record amplifier and switching circuit" as distinguished from the prior art "discrete record amplifier and switching circuit". The hybrid structure reduces the number of elements which should be connected in parallel to a video head and thereby stray capacity. The illustrative embodiment is basically implemented as a emitter-follower circuit and is, therefore, free from the mirror effect. It follows that considering the illustrative embodiment as a switching circuit, the input capacitance is smaller than the prior art by more than two figures while the input impedance is higher than the prior art by more than two figures, enhancing high-speed switching operations.

In summary, it will be seen that when a switching circuit of the present invention is used to switch over the record/playback mode of a video tape recorder, it is possible to execute compulsory local overwriting while the playback of a recorded tape is under way. This allows characters, graphic information, VITC signal or similar multiplex signal carrying desired information to be recorded in the same manner as postrecoding in a recorded magnetic tape which is being played back.

Various modifications will become possible for those skilled in the art after receiving the teachings of the present disclosure without departing from the scope thereof.

What is claimed is:

1. A switching circuit for interrupting a signal path to a recording head comprising:
   complementary emitter-follower means comprising first and second transistors;
   a power source terminal to which a DC bias voltage for linearly driving said first and second transistors is applied:
   signal inputting means connected to said power source terminal and comprising first and second input connecting points to which said DC bias voltages is applied; and
   switching means comprising first and second switches each having a single movable contact which is operated by a switching pulse signal and two stationary contacts, said movable contact of said first switch and said movable contact of said second switch being respectively connected to a base of said first transistor and a base of said second transistor, one of said stationary contacts of said first switch and one of said stationary contacts of said second switch being respectively connected to said first and second input connecting points of said signal inputting means, the other stationary contact of said first switch and the other stationary contact of said second switch being connected such that said first and second transistors are inversely biased upon interruption of the signal path.

2. A switching circuit as claimed in claim 1, wherein said first transistor and said second transistor comprise an NPN transistor and PNP transistor, respectively.

3. A switching circuit as claimed in claim 1, wherein said switching pulse signal comprises a record/playback switching pulse signal of a video tape recorder.

4. A switching circuit as claimed in claim 3, wherein a record signal of the video tape recorder is applied to said first and second input connecting points of said signal inputting means.

5. A switching circuit as claimed in claim 4, wherein an output signal of said complementary emitter-follower circuit is fed to a junction of an input of a video head constituting said recording head and an input of a playback amplifier of the video tape recorder.

* * * * *